United States Patent [19]

Bernhardt

[11] Patent Number: 5,209,631
[45] Date of Patent: May 11, 1993

[54] ARRANGEMENT FOR FLOODING HIGH SPEED VACUUM PUMPS

[75] Inventor: Helmut Bernhardt, Wetzlar, Fed. Rep. of Germany

[73] Assignee: Arthur Pfeiffer Vakummtechnik Wetzlar GmbH, Asslar, Fed. Rep. of Germany

[21] Appl. No.: 728,644

[22] Filed: Jul. 11, 1991

[30] Foreign Application Priority Data

Jul. 16, 1990 [DE] Fed. Rep. of Germany ....... 4022523

[51] Int. Cl.$^5$ .................. F04D 19/04; F04D 27/00
[52] U.S. Cl. ........................ 415/90; 415/13; 417/293
[58] Field of Search ............. 415/90, 13, 36, 232; 417/293

[56] References Cited

U.S. PATENT DOCUMENTS 4,588,361 5/1986 Saulgeot .

FOREIGN PATENT DOCUMENTS

| 0193609 | 9/1986 | European Pat. Off. . | |
|---|---|---|---|
| 2034327 | 1/1972 | Fed. Rep. of Germany | 415/90 |
| 2825551 | 12/1979 | Fed. Rep. of Germany . | |
| 43297 | 3/1986 | Japan | 415/90 |
| 191696 | 8/1987 | Japan | 415/90 |
| 239397 | 10/1988 | Japan | 415/90 |
| 848760 | 7/1981 | U.S.S.R. | 415/90 |

OTHER PUBLICATIONS

"Soviet Inventions Illustrated", Dewent Publications, Sections P-Q, p. 9009, Apr. 11, 1990.
"Patent Abstracts of Japan", The Patent Office Japanese Govt., p. 93, Jan. 23, 1989.

Primary Examiner—Edward K. Look
Assistant Examiner—Michael S. Lee
Attorney, Agent, or Firm—Anderson, Kill, Olick & Oshinsky

[57] ABSTRACT

The invention describes an arrangement for optimum flooding of high speed vacuum pumps. The actuation of the flood valve (6) is controlled by the forces, which, among other things, are exerted upon the rotor by the flooding process. These forces are determined and used to actuate a flood valve controlling entry of the flooding gas. Such forces can be measured in active magnetically supported rotors by masuring the currents in the magnetic bearings (10 and 12). In case of hybrid bearing systems and purely mechanical bearing systems, force measurement is possible indirectly by means of measuring the distance or spacing between the rotor and the stator, or, alternatively, also by means of force sensors.

7 Claims, 1 Drawing Sheet

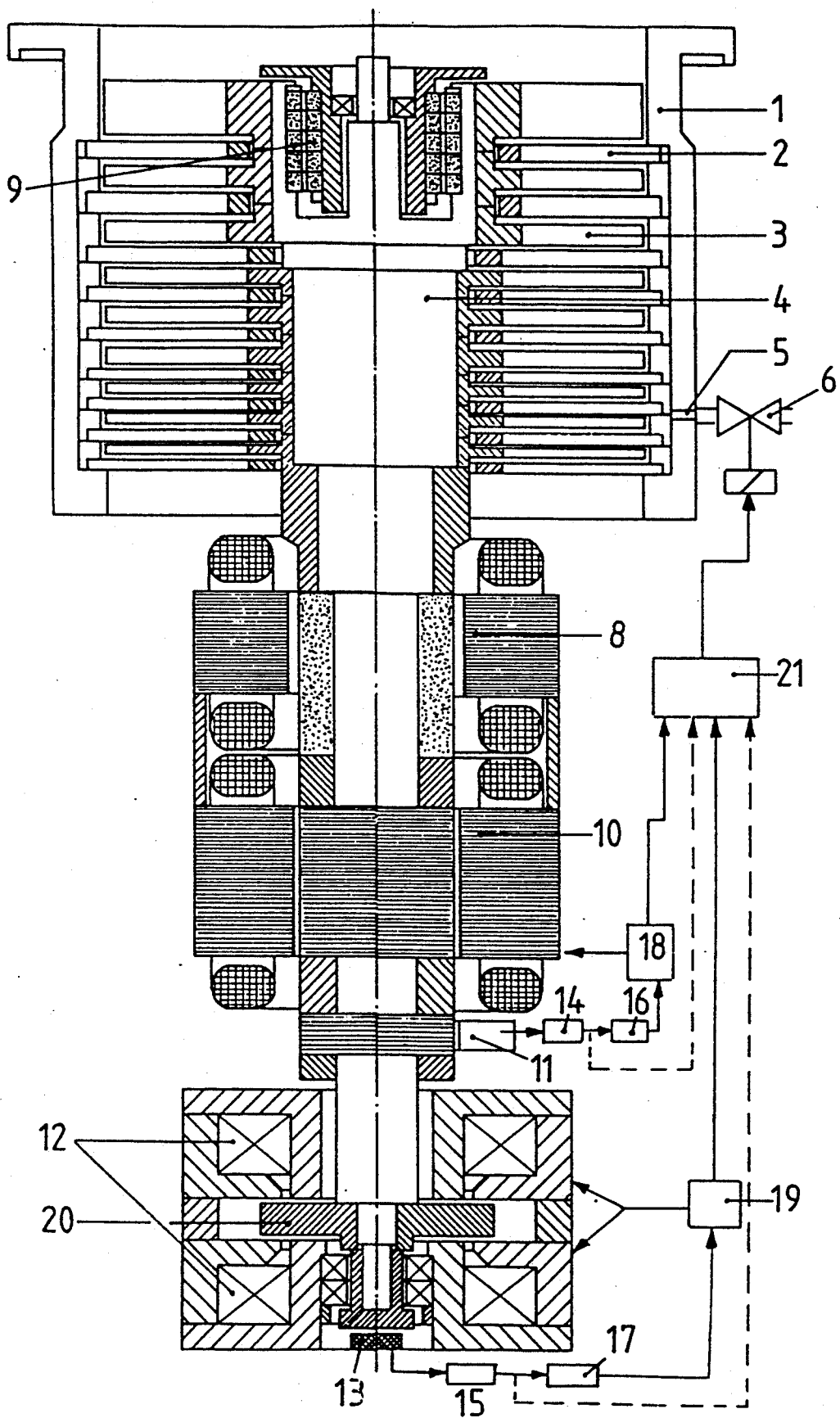

ARRANGEMENT FOR FLOODING HIGH SPEED VACUUM PUMPS

The invention is directed to an arrangement for flooding high speed vacuum pumps with a flooding gas.

BACKGROUND OF THE INVENTION

Turbo molecular pumps are among the most widely used high speed vacuum pumps. The problems, task definition and its solution will be explained below using the example of turbo molecular pumps.

Turbo molecular pumps assure a pumping technology devoid of oil vapors due to their selective pumping behavior. If, however, a turbo molecular pump is stopped, oil vapors and other contaminants can travel from the forepressure side to the high vacuum side and cause considerable contamination there, which is perceived in a very disadvantageous fashion as initial contamination when the pump is switched on again. The contaminants, especially oil residues, entail a considerable lengthening of the pump-down time. This can be prevented if turbo molecular pumps are flooded after being switched off. Then the inside surfaces of the pump and of the recipient or chamber being pumped are acted upon by flooding gas, so that the pump-down time is essentially shortened when the pump is switched on again. Apart from that, the flooding causes a shortening of the coasting time of the rotor, a criteria which is of particular importance when pumping with magnetic bearings due to the absence of friction.

Turbo molecular pumps equipped with flooding arrangements are described in the DE-PS 18 09 902 and the publication "Vacuum Technology", 20th year of publication (1971), volume 7, page 201 and following.

It is evident from these publications that some flooding conditions can be optimally fixed, in order to attain as short a pump-down time as possible after the pump is again switched on.

An important problem, however, which deals with the flooding rate, has since been handled in an extremely unsatisfactory manner. The problem is—with what velocity the flooding gas is to be introduced into the pump in order to further improve the optimum flooding conditions and above all in order to avoid disadvantageous effects.

This problem exists especially in pumps with magnetic bearings. The criteria which must above all be dealt with, in this case, are the long coasting or run down-time, which is due to the absence of friction, and the limitation on extraneous forces acting upon the rotor.

The question of the flooding rate to begin with comes down to the cross-section of the valve opening. With a small cross-section, meaning when the pump is flooding too slowly, there results an excessive coasting time of the rotor, which in most applications can no longer be justified.

With a large cross-section, the forces which act due to the entering gas flow upon the rotor are so large that critical situations can arise in which, for instance, the rotor makes contact with the emergency bearings because of over-loading the axial bearing. With average cross-sections, the two disadvantageous effects cross over, so that no satisfactory solution can be achieved by varying the cross-section of the valve opening. Also, with the same constructional size of a pump, recipients or receivers being pumped having very different volumes can be connected, which additionally complicates the predetermination of optimum flooding conditions for a specific type of pump.

For pumps with conventional bearings, the conditions present themselves as follows. In pumps of small and average constructional size, a compromise between the requirements of sufficiently high flooding rate and forces of inconsiderable magnitude on the rotor can to some extent be realized, since ball bearings can carry high forces for short time periods. In large pumps, the flooding rate must be increased so that the flooding time period does not become too long. This, however, entails larger forces which means higher loads on the bearings and other serious disadvantages. For instance, the deformation of the rotor blades by the flooding forces increases with increase of the rotor diameter. Limits are set here already for reasons of strength of materials. In order to avoid contact with the spacer discs, the spacing between rotor and stator discs must be increased or other measures must be taken, which have negative effects upon the output characteristics of the pump.

Another possibility of varying the flooding rate consists in opening and closing the flood valve at timed fixedly preset intervals. This requires additional effort, which is not justified by the results. An optimum flooding process cannot be achieved even by this, since different parametric conditions, as for instance, recipient size, type and pressure of the flooding gas, and operation of the back-up pump, can not be taken into account. The same disadvantages as described above result depending upon the cycle times.

SUMMARY OF THE INVENTION

The chief object of the invention is an arrangement which enables to optimumly flood high speed vacuum pumps. This means that the quantity of flooding gas allowed to enter is of such magnitude that a satisfactory short coasting time of the rotor is achieved and that simultaneously at any point in time of the flooding process the forces which additionally act upon the rotor due to the entering flooding gas are held within such limits that the rotor itself, the drive and the bearing system, are not exposed to critical phases in which its operation is threatened or impaired.

According to one aspect of the invention, controlled flooding is obtained in response to the forces which act upon the rotor due to the entering flooding gas. These forces are determined and used to actuate a flood valve controlling entry of the flooding gas. Such forces can be measured in active magnetically supported rotors by measuring the currents in the magnetic bearings. In case of hybrid bearing systems and purely mechanical bearing systems, force measurement is possible indirectly by means of measuring the distance or spacing between the rotor and the stator, or, alternatively, also by means of force sensors.

The solution in accordance with the invention permits an optimum flooding. This means that it is possible to use a flood valve with a large cross-section, and during the coast down of the rotor to permit such a quantity of flood gas to enter that the forces which in total act upon the rotor do not exceed a preset value determined by safety criteria. The coasting time of the rotor is thus reduced to a minimum with a maximum of safety.

The control of the cycle times of the flood valve by the rpm of the rotor is another possibility of allowing a maximum quantity of flood gas to enter with due regard of the safety criteria. The gas quantity introduced must be small at high rpm's, meaning short opening periods of the flood valve, but can be increased with decreasing rpm, meaning longer opening periods.

With rotors having an actively regulated magnetic bearing system, there is in most cases a force measurement available by means of measured values which are available anyway in the regulation circuit of the magnetic bearing. The regulation is realized in these cases in such a way that the working point or the operating point of the rotor, meaning its axial position, is constant. Thus, for a particular example, the air gap between the axial magnet and the axial bearing disc mounted on the rotor is also constant. With a constant air gap, the current in the electro-magnet is a direct measurement for the force produced. If one wants to limit the force to a predetermined maximum, this is tantamount to limiting the current to the associated value. Only a simple limit value monitoring is necessary which closes the flood valve when this limit value is exceeded. If no additional flood gas flows in anymore, the rotor is braked, and the differential pressure on the rotor discs drop. A pressure compensation occurs in the pump, whereby the force acting upon the rotor diminishes. After passing through a hysteresis which, for instance, can be realized in the limit value monitoring, the flood valve is again opened, and so on. The switching frequency of the valve is adjusted by the hysteresis.

In rotors whose position is not regulated by an active magnetic bearing system, rather, for instance, by a hybrid or composite bearing system, a different solution is preferred. If rotor and stator are linked with each other by a spring constant, then there results a characteristic force curve as a function of the spring excursion, so that a limitation of the force can be attributed to a limitation of the excursion. The current limit value monitoring described above is thus merely replaced by a travel limit value monitoring. For the rest of it, the functional mode is the same. The displacement of the axial position of equilibrium of the rotor caused by the entering flooding gas, can be used for regulating the flood valve, by attributing in this case also a limitation of the force to a limitation of the excursion of the rotor.

In mechanically supported rotors, a direct force measurement, for instance, by force sensors, can also be utilized for controlling the flood valve.

The described possibilities of measuring forces acting upon a rotor are here described with an example of axial forces acting upon the rotor of a turbo molecular pump. Analogous criteria and solution possibilities apply also to forces acting in a radial direction upon a rotor.

The solution possibilities according to the invention can be equally well transposed to other vacuum pumps. For instance, radial oscillations of the rotor of a molecular pump of the Holweck type can be kept within limits by controlling the flooding process. The measurement of the forces acting upon the rotor is then performed, for instance, by means of a travel measurement as above described.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

The sole FIGURE is a cross-sectional, partly schematic, view of one form of turbo molecular pump according to the invention.

DETAILED DESCRIPTION OF THE PREFERRED EMBODIMENTS

Pump elements comprising stator discs 2 and rotor discs 3 connected with a rotor shaft 4 are located in the housing 1 of a conventional turbo molecular pump. For entry of the flooding gas, a gas inlet stub 5 with a flood valve 6, which may be fastened at the housing, is provided. A supply of the flooding gas (not shown) is connected to the right hand end of the valve 6. The driving device for the rotor shaft is designated by the numeral 8.

The bearing system of the rotor in the example described here comprises a passive magnetic radial bearing 9 on the upper side of the pump where the suction stub 5 is located, as well as an active magnetic radial bearing 10 below the drive unit 8 and an active magnetic axial bearing 12 at the lower end of the rotor shaft. Radial sensor 11 and axial sensor 13 serve for measuring the radial and the axial positions of the rotor shaft in a known manner. Control signals are generated in the usual way by the sensor processors or evaluation units 14 and 15 and the conventional regulators 16 and 17, which regulate the currents in the active magnetic bearings 10,12, respectively, through power amplifiers 18 and 19 in such a way that the rotor remains in a specific stable position during operation.

The control of the active magnetic axial bearing 12 occurs, for instance, in such a way, that the gaps between the axial magnets 12 and the axial bearing disc 20 are maintained constant. If an additional force acts upon the rotor, then the current in the electro-magnet changes and is thus a direct measure for the additional force. This is taken advantage of in this embodiment by deriving a signal from the respective power amplifiers 18, 19, responsive to that current change, and processing that signal in a known electronic control system 21 which is connected via a control to the flood valve 6. The processor 21 preferably includes means for monitoring the signal current, which increases with increased exerted forces, and includes a limit switch triggered when the limit is reached.

If a predetermined current intensity is exceeded which corresponds to a specific force upon the rotor, because of the limit value monitoring 21, the flood valve 6 is closed. After that, a pressure compensation occurs in the pump whereby the force upon the rotor diminishes again. The current intensity also drops and in response the flood valve 6 is opened again.

In other cases as described above, where no current change of an active magnetic bearing is available for the regulation process, a displacement of the rotor cam be used as a force measurement. For these cases, the axial sensor 13 can be used. There is a direct relationship between the gap width between sensor 13 and the shaft end, and the force acting on the rotor, which makes it possible to control the flood valve 6 by the limit value monitoring 21. In this case, as shown by the dashed line connections, the control signal is derived from the respective processors 14, 15 and inputted to the monitor 12.

While the invention has been described in connection with preferred embodiments, it will be understood that modifications thereof within the principles outlined above will be evident to those skilled in the art and thus the invention is not limited to the preferred embodiments but is intended to encompass such modifications.

I claim:

1. An arrangement for flooding high speed vacuum pumps comprising:
   a rotor;
   a controllable flood valve connected by means of a gas inlet stub at a housing of said vacuum pumps for permitting flooding gas to enter;
   a control device provided for actuating said flood valve as a function of forces acting upon said rotor in one of its axial and radial directions; and
   a magnetic bearing support means including an actively regulated, magnetic bearing with which at least one degree of freedom of said rotor is stabilized wherein a constant spacing exists between said rotor and a pump stator and further wherein additional forces acting upon said rotor are compensated for by a current change in said actively regulated magnetic bearing and further wherein said control device comprises a limit value monitor for actuating said flood valve when the current in said magnetic bearing exceeds predetermined limit values.

2. An arrangement for flooding high speed vacuum pumps comprising:
   a rotor;
   a controllable flood valve connected by means of a gas inlet stub at a housing of said vacuum pumps for permitting flooding gas to enter;
   a control device provided for actuating said flood valve as a function of forces acting upon said rotor in one of its axial and radial directions; and
   at least one position sensor mounted for measuring the spacing between said rotor and a pump stator wherein the control device comprises a limit value monitor for actuating the flood vale as a function of the spacing between said rotor and said stator.

3. An arrangement for flooding high speed vacuum pumps comprising:
   a rotor;
   a controllable flood valve connected by means of a gas inlet stub at a housing of said vacuum pumps for permitting flooding gas to enter;
   a control device provided for actuating said flood valve as a function of forces acting upon said rotor in one of its axial and radial directions; and
   a mechanical bearing for stabilizing at least one degree of freedom of said rotor of said vacuum pump and wherein a force sensor is provided at a location of said mechanical and further wherein said control device further comprises a limit value monitor for actuating the flood valve as a function of the forces acting upon said rotor.

4. Arrangement for controlled gas flooding of a high speed turbo molecular vacuum pump having a rotor and means including a controllable flood valve for introducing flooding gas into the pump interior, wherein means are provided for sensing additional forces exerted on the pump rotor when the flooding gas is introduced and for actuating the flood valve in response, respectively, to increases and decreases in the additional forces.

5. An arrangement for flooding high speed vacuum pumps which comprises:
   a housing;
   a rotor;
   a controllable flood valve wherein said controllable flood valve is connected at said housing by means of a gas inlet stub and wherein said controllable flood valve permits a flooding gas to enter said pump;
   a control device for at least one of actuating and controlling said flood valve as a function of forces acting upon said rotor in one of its axial and radial directions;
   a magnetic bearing support means which further comprises an actively regulated magnetic bearing with which at least one degree of freedom of said rotor is stabilized and further wherein a spacing exits between said rotor and a pump stator which spacing is contact and wherein additional forces which act upon said rotor are compensated for by a current change in said actively regulated magnetic bearing and further wherein said control device further comprises a limit value monitor for at least one of actuating and controlling said flood valve when said current in said magnetic bearing exceeds a predetermined limit value.

6. The arrangement of claim 5 further comprising:
   at least one position sensor mounted for measuring said spacing between said rotor and said pump stator wherein said control device further comprises a limit value monitor for at least one of actuating and controlling said flood valve as a function of said spacing between said rotor and said pump stator.

7. The arrangement of claim 5 further comprising:
   a mechanical bearing for stabilizing at least one degree of freedom of said rotor of said vacuum pump wherein a force sensor is provided at a location of said mechanical bearing and further wherein said control device further comprises a limit value monitor for at least one of actuating and controlling said flood valve as a function of forces acting upon said rotor.

* * * * *